INFORMATION STORAGE APPARATUS

Filed Dec. 30, 1954

INVENTOR.
WILLIAM R. STEWART
BY
P. C. Nemminger
ATTORNEY

United States Patent Office 2,869,789

Patented Jan. 20, 1959

2,869,789

INFORMATION STORAGE APPARATUS

William R. Stewart, Vestal, N. Y., assignor to International Business Machines Corporation, New York, N. Y., a corporation of New York Application December 30, 1954, Serial No. 478,841

4 Claims. (Cl. 235—61.11)

This invention relates to apparatus for storing information on tape and reading the stored information.

A Mobius tape strip is a strip of endless tape having a one-sided endless surface formed by a single twist in the tape loop. In a Mobius tape, one complete traverse along the surface of the tape covers both sides of the tape. Two revolutions of the Mobius tape are necessary for one complete traverse of the surface, so that the starting point is reached only after two complete revolutions of the strip.

A strip of Mobius tape may be long enough to contain a number of loops which are stored in the reading apparatus one within the other and can store information in the loops.

Heretofore, continuous functions have not been stored on a tape in a form which permits them to be read repetitively and continuously with the use of one set of functions to provide both the sine and cosine functions. It is an object of this invention to provide symmetrical functions having positive going and negative going functions stored in the form of punched holes in a tape and readable repetitively and continuously by a single reading head.

It is another object of this invention to provide a tape reading apparatus which obtains a maximum amount of use from a minimum amount of tape area.

It is another object of this invention to provide an apparatus for reading an endless strip of tape in which the stored portions of the tape and the portion of the tape at the tape reading head may move at independent speeds and are independently driven.

It is a still further object of this invention to provide an endless tape and apparatus for reading the endless tape which allows for continuous and uninterrupted reading of the functions presented on the tape.

It is a still further object of this invention to provide an apparatus employing a Mobius tape in which both positive and negative portions of a symmetrical function are punched in the tape and can be read during an uninterrupted traverse of the tape.

It is another object of this invention to provide an improved apparatus employing a Mobius tape having an easier drive.

It is another object of this invention to provide an apparatus capable of driving a Mobius tape in both forward and reverse directions at will.

It is still another object of this invention to provide an apparatus for reading and storing a Mobius tape in which the tape is provided with a means for keeping the storage loops at predetermined different lengths and preventing slipping in the feed of the tape.

It is a still further object of this invention to provide a Mobius tape in which rapid and accurate reading of the tape is possible.

It is still another object of this invention to provide an apparatus for reading endless tape which as a whole is small in size and in which a natural flow of tape is maintained during reading, and in which the length of the reading loop is small relative to the entire tape loop.

This invention provides a method of reading functions on an endless tape in which functions, discontinuously recorded on the tape, may be continuously read to provide a continuous function.

These and other objects of this invention will become apparent upon consideration of the following description taken together with the accompanying drawings, in which.

Figures 1, 2, 3, 4:
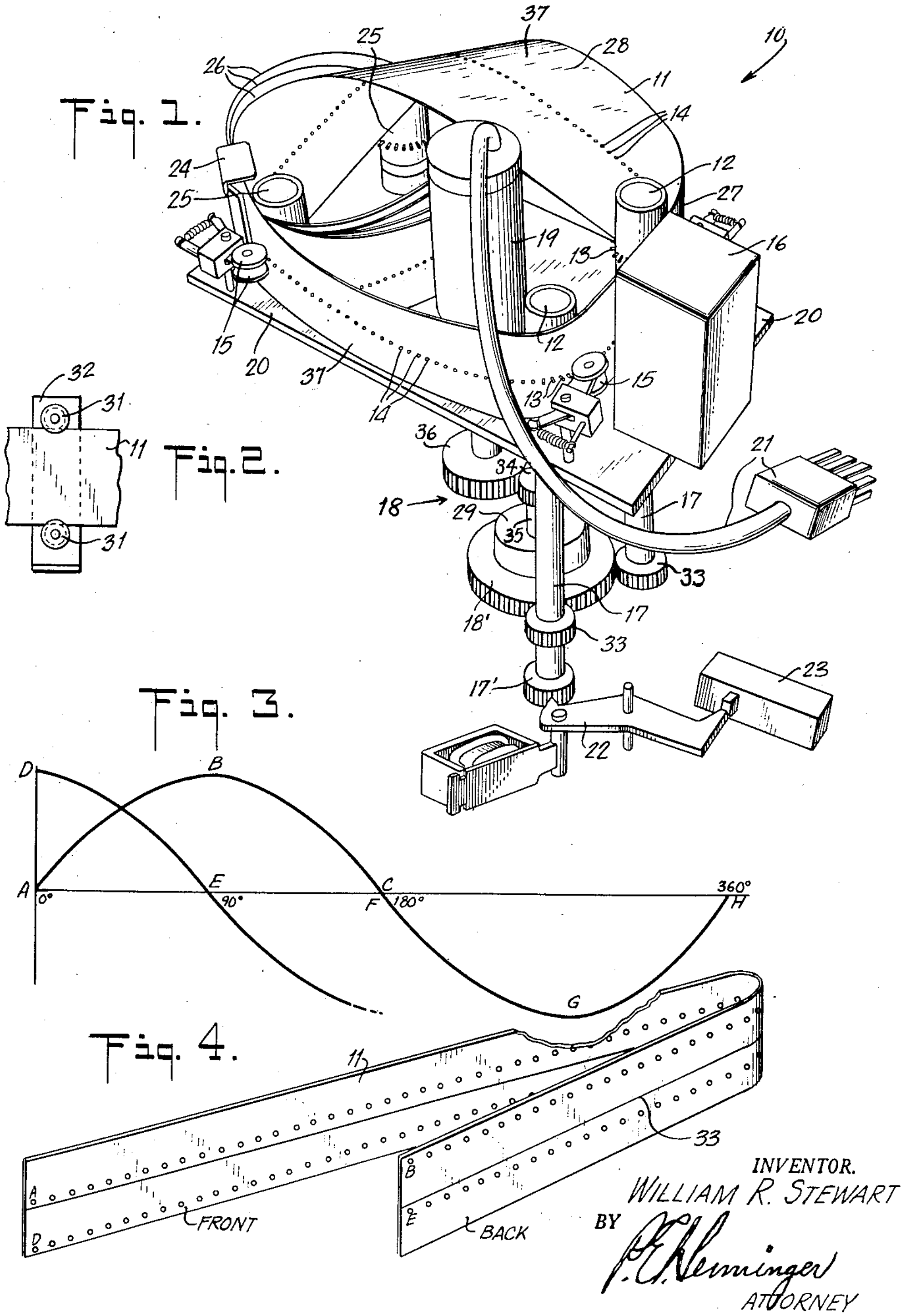
Figure 1 is a perspective view of apparatus for reading a Mobius tape according to this invention, together with a Mobius tape positioned in the apparatus.
Fig. 2 is a front elevational view of a modified tape guide for the Fig. 1 apparatus.
Fig. 3 is a graph of two sinusoidal curves.
Fig. 4 is a perspective view of the two sides of the tape of this invention before the ends join to make a continuous loop.

In general, this invention provides a Mobius tape and apparatus for reading the information on a Mobius tape in which the increasing value and decreasing value portions of a symmetrical function are present on the tape and read by the apparatus from a single continuous traversing of the surface of the tape. A function can be read continuously without switching, and with an opaque tape information can be written on both sides of the tape. The apparatus of this invention holds the Mobius tape so that the twist of the tape is positioned in the reading loop of the tape and the apparatus drives and holds the tape on sprocket teeth in tape perforations.

Fig. 1 shows apparatus 10 in which is mounted a Mobius tape 11. The tape 11 is driven mainly by two sprockets 12 which are geared together and move the tape by means of teeth 13 which engage in perforations 14 in the tape. The tape is held on the sprockets 12 by spring loaded pressure rolls 15. The Mobius tape 11 is thus positioned at a read head 16. The read head 16 is of suitable structure that enables it to sense the data recorded on the Mobius strip 11.

The sprockets 12 are mounted and turn with shafts 17 which are driven by gears 18 from a motor 19 on a common chassis 20. The motor 19 drives the gears 18 and positions the tape 11 under the control of any suitable device. The motor 19 is connected by a cable and block 21 to a suitable source of power. The gears are intermittently positioned by a detent mechanism 22 which engages one of the gear shafts, as shown in Fig. 1. The reciprocation of the detent mechanism 22 results in intermittent motion of the gears 18 and by locking the gears acts to hold the tape 11 centered for reading by the read head 16. Suitable means for mounting the gears will allow this intermittent motion.

The detent mechanism 22 engages a pinion 17′ on one of the sprocket shafts 17 to provide intermittent motion to the gears. The sprocket shaft 17 has mounted thereon a gear 33 which, in turn, engages a gear 18′ on an idler shaft 35. The idler shaft 35 also carries a pinion gear 34 which engages a drive gear 36, which is mounted on the motor shaft. The gear 18′ is mounted on the idler shaft 35 through a collar 29. The collar 29 has incorporated in it a suitable mechanism, such as a spring clutch, to allow minor differential action between the gear 18′ and the shaft 35. The sprockets 12 are driven from the gear 36 through the pinion gear 34 and the drive shaft 35 to the collar 29 which carries the gear 18′. The gear 18′ engages the respective gears 33 on the sprocket shafts 17. The clutching action in the collar 29 may allow relative differential rotation between the shaft 35 and the gear 18′ of plus or minus 3°. This minor differential action provides the intermittent motion to the tape reading operation. A switch 23 which is operated by the detent mechanism 22 controls the reading operation of the head 16, each time the tape is centered for sensing between the sprockets 12 by the gears 36, 34, 18′ and 33. Thus, each reading cycle involves centering the gear 18′ by means of the detent mechanism 22 and operation of the switch 23 to initiate the reading operations of the read head 16. When a change is indicated by the control source, release of the detent mechanism 22 allows an advance of the gear 18′ to move the tape 11 to a new position for reading.

The apparatus 10 has at least one guide 24 adjacent a rear sprocket 25 to assist the rear pressure roll 15 and the sprocket 25 in holding the tape in position. The tape 11 is looped in storage loops 26 around the sprockets 25 and loops 26 are held in position between the rear pressure roll 15, the guide 24 and the sprockets 25. The tape 11 is fed to a reading loop 27 from the inside of the storage loops 26. A twist 28 is provided in the reading loop 27 of tape 11 between the storage loops 26 of the tape 11 and the reading area of the tape 11 between the sprockets 12 adjacent the read head 16.

The sprocket teeth 13 and the perforations 14 in the tape 11 maintain the loops of the tape 11 without slippage so that each storage loop 26 has a predetermined length which is maintained during the drive of the tape 11 by the gear and sprocket means.

In the operation of the apparatus 10 with the tape 11, tape 11 may be moved in either direction and in one form of the invention the speed of motion up to seven and one-half inches per second has been obtained in each direction. The speed of tape feed is determined by the gears 18 which drive the sprockets 12 and 25. The guide 24 assists in leading the tape 11 into the storage loops 26 and assists in the smooth operation of the apparatus. In moving the tape for reading with this apparatus, there is a minimum of mass in motion.

Fig. 2 shows a modification of the guide means for the Mobius tape 11 as consisting of a pair of rollers 31 which laterally engage the top and bottom edges of the tape 11 and hold it in upright position and allow easy longitudinal motion. The rollers 31 on their mounting 32 may be substituted for the guides 24, shown in the embodiment of Fig. 1. The rollers 31 have circumferential surfaces which are concave to prevent the tape from slipping axially out of the retaining grip of the paired rollers 31.

A Mobius tape, such as tape 11, is a continuous strip of tape formed by joining two ends of a normally two-sided strip after a 180° twist of the ends with relation to each other. In reading punched information from tapes, the tape normally can be read from only one side as the punched holes of necessity must penetrate completely through the tape and provide on the opposite side of the tape holes which correspond to the holes on the reading side of the tape. This invention provides a device which continuously reads a single piece of tape and continuously reads continuous functions on a single piece of tape without interruption of the reading of the function by the reading means of the apparatus. This device accomplishes this novel result with a punched tape by reading information from two sides of a punched tape by continuous reading and without interruption of the motion of the tape or rearrangement of the tape in its presentation to the reading means.

This accomplishment results from the novel inversion of information on the tape by the 180° twist, such that the information can be read as two functions, one non-inverted, the other inverted, i. e., B, C and D, E are both read out of the apparatus using only the information punched for D, E.

Fig. 3 shows curves of sine and cosine functions. Curve A, B is the sine function of the increasing positive phase; curve B, C is the sine function of the decreasing positive phase; curve D, E is a cosine function of the decreasing positive phase, and is identical to curve B, C, but 90° out of phase with B, C. A curve F, G is a sine function of an increasing negative phase and curve G, H is a sine function of a decreasing negative phase.

Fig. 4 shows a strip of punched tape 11 according to this invention, divided into an upper half and a lower half by a medial line 33 corresponding to the neutral axis of Fig. 3. On the upper half of the tape 11, there are punched holes corresponding to the sine function, curve A, B of Fig. 3. On the lower half of the tape 11 are punched holes corresponding to the cosine function, curve D, E of Fig. 3. The tape 11 of Fig. 4 is curved back on itself to show both sides and to indicate how the punched holes carrying the functions penetrate through the tape and represent the functions on both sides of the tape 11. To prepare tape 11 for use in the apparatus of this invention, the two ends of the tape are, as stated, twisted 180° with respect to each other and are then joined together. When thus joined, the B end of the sine function perforations are adjacent the D end of the cosine function perforations and vice versa, and the A end of the sine function perforations are adjacent the E end of the cosine function perforations. When the tape 11 is placed in the apparatus 10, one-half of the tape 11 is continuously read by the read head 16. Starting at A of the sine function and reading progressively of the sine function at A, and reading progressively along the perforations, the read head 16 will sense the sine function. By the time the tape has been traversed to the point B, 90° on the sine function, the inversion of the tape by the twist of the tape will bring the point D, 0° on the cosine function, to the read head 16. At this point, the read head 16 will pass the juncture of the two ends of the tape 11, and the read head 16 will have presented to it the beginning of the cosine function D, E. Because of the inversion of the tape by the twist 28, the read head 16 while reading the upper portion of the tape as presented to it, is actually reading on the back of the bottom of the tape, as shown in Fig. 4. The read head 16 will continue to receive the apparent upper half of the tape loop and in doing so, it will read the cosine function D, E. When point E has reached the read head 16, a traversing of a sine function, equivalent to A, B, C, will have been accomplished, because the shape of D, E is identical to the shape of B, C. Also, the tape will have carried the point A, 0 degrees on the sine function, back to the read head and the traversing of the sine, cosine functions will begin again.

As it is generally desired to read a sine, cosine function, first in a positive phase, followed by the negative phase, and then again in a positive phase, etc., it may be desired to switch the polarity of the reading signals sensed by the read head 16, each time the sensing of a sine function has been completed. Thus, referring to Fig. 3, after the read head 16 has scanned the sine function A, B and the cosine function D, E, switching of polarity of the signals obtained from the read head 16 by any suitable means, can cause the next traversing of the surfaces of the tape 11 by the read head 16 to sense a negative sine curve, corresponding to F, G, H.

It thus will be seen that the apparatus 10 can sense the information punched in a tape, such as tape 11, by continuous reading to produce a continuous symmetrical function. It may also be seen that by reading both halves of the tape simultaneously that both sine and cosine values are obtained as continuous symmetrical functions.

If the functions which are continuously read are not symmetrical, it will not be necessary to invert information, but the information may be read from punched holes in the tape. In the case of a non-continuous function, as for example random functions, the functions are continuously read but are not recorded on the tape 11 in inverted form to provide symmetry. In this latter case, the functions are punched in the tape so as to be continuously readable upon presentation of the tape to the read head 16.

A feature of this invention may be employed with opaque tape to provide continuous reading of a symmetrical function, so that the function is read continuously and symmetrically. The twist 28 in the tape 11 causes inversion of the information on one side of the tape with relation to the information on the other side of the tape as the tape is presented to the read head 16, as stated for example, the positive phase of a sine curve, such as A, B, C of Fig. 3, is printed or otherwise inscribed on one surface of an opaque tape according to this invention. A negative phase F, G, H is printed or otherwise inscribed on the opposite side of the tape of this invention. The information for the F, G, H sine functions of the negative phase are printed on the back of the tape 11, so that the point F is at the same end of the tape as the point A, but on the opposite side, and the point H is on the same end of the tape as point C, but on the opposite side. The point G of the function information is, therefore, at the center of the tape as is the point B, but on the opposite side. Also, the information is printed inversely in relation to the height of the tape, so that the point B is adjacent the top edge of the tape and point G is adjacent the bottom edge of the tape. When the two sides of the opaque tape, according to this invention, are thus provided with information and the two ends are joined together after a 180° twist, the points A and H are adjacent each other, and the points C and F are adjacent each other.

A continuous reading of the tape by a read head, such as read head 16 of the apparatus 10, described in conjunction with Fig. 1, presents the sine functions of the positive phase and the sine functions of the negative phase in continuous contiguity. In other words, as the read head 16 passes point C, it is immediately presented with point F and conversely as the read head 16 passes the point H, it is presented with point A.

By switching the polarity of the information sensed by read head 16, as points A and F pass the read head 16, the symmetrical function is read as positive and negative phases of a continuous sine, cosine curve.

Another means of mounting the positive and negative phases of a continuous sine curve on a tape is provided bymounting the positive phase A, B, C on one of the halves of the tape and mounting the negative phase F, G, H on the other side of the same half of the tape, for example, the upper half. The F, G, H curve is mounted on the tape below the medial line identical with the mounting of the A, B, C curve above the medial line. When a tape thus inscribed with curves A, B, C and F, G, H is twisted and joined to form a Mobius strip, a continuous positive phase to negative phase in continuous contiguity is provided by the curves A, B, C and F, G, H. With the sine curve mounted on the tape in this manner, no switching will be required. By employing a suitable read head, which considers the medial line as zero, and values to one side as positive and those to the other side as negative, the information as presented to the read head will be the same as a sine curve drawn in its positive and negative phases on a sheet of paper. Thus, no switching is required to read the full range of values. This means of recording a sine curve on the tape of this invention may employ punched holes as well as inscription on an opaque tape.

The apparatus of this invention provides a minimum of mechanism in the presentation of the source of information to the reading head. As a result, the low mass permits rapid speed changes. This may be enhanced by the use of slack control. The slack control provides slack sections in the tape at both sides of the reading area, i. e., in the twist section 28 and in a slack section 37 of the tape 11 adjacent the sprocket 12 at the other side of the read head 16 from the twist section 28. The storage section of the tape 11 which includes the storage loops 26 is connected to the section being read by the twist section 28 and by the slack section 37. Consequently, it would be possible to provide a separate motor for the movement of the storage section of the tape 11, with the separate motor under control of some means for sensing the need for slack in either direction for both directions of feed.

Various modifications of the tape and the apparatus of this invention may be made. For example, the tape 11 may be a transparent tape coated black to indicate information having a reflected binary code whith photoelectric reading to avoid the use of code holes. Moreover, other means of inscribing or recording information on the tape may be employed in connection with this invention. Also, the capacity may be varied by storage and reading variations. The length and the width of the tape may be changed to meet the various requirements and the number and size of storage coils may be varied to provide capacity variations on a single mechanism.

In the apparatus 10, shown in and described in connection with Fig. 1, the read head 16 performs the tape reading operation in cooperation with two sprockets 12. It has been found that one of the sprockets 12 may be omitted and that the reading loop of the tape 11 can be driven by a single sprocket 12 while information on the tape 11 is read by a reading means positioned at and cooperating with the single sprocket 12. In this modification, the reading means is positioned closer to the sprocket 12 than the read head 16, shown in Fig. 1.

Other possible modifications include a ratchet drive feed and also a constant speed drive for use with magnetic storage tape.

If it is not desired to invert the information on the tape, as in the case of storing and reading tangent functions or random information, only half of the tape width need be employed at one time, thus the tape would effectively be half as wide but twice as long.

The various advantages of this apparatus in combination with a Mobius tape are readily apparent.

A symmetrical function can be continuously read repetitively from a single length tape on which the function information is inscribed in the form of punched holes. This result is advantageous as it allows for maximum exploitation of the tape area and eliminates the loss which results from the use of only one side of a punched tape for the recording of information. This advantage is, of course, a function of inversion of the information during the reading of the continuous one-sided Mobius tape. By maintaining the twist in the tape in the portion thereof which extends between the storage area and the reading area, it is possible to withdraw the tape from the storage area without kinking, and at the same time a natural flow of the tape to the read head is maintained. As a further advantage, both sides of a single loop of tape can be employed for the storage of a symmetrical function while providing an uninterrupted surface for the presentation of the symmetrical function to a read head. Also, the storage section may be driven more easily and with less strain on the reading section as the moving parts of the apparatus are not tilted with relation to each other. The reading portion of the tape and the storage portion of the tape may be moved by independent drives. The reading area is under the control of the detent mechanism 22 and the switch 23 as described above and is moved intermittently. This provides for more rapid reading. The storage section is driven by a different motion and as described above, may be driven by a separate motor. Also, by driving with sprockets, the storage loops may be maintained at predetermined different lengths with the result that the storage loops do not have to slip with relation to each other and not as much power is required to move the tape. Therefore, smoother and better control is obtained.

Further advantages are the low mass of the moving parts in the reading area, the relatively light weight of the apparatus and its reliability of function. These factors, coupled with the economy of tape and space provided by this invention, make for great utility in this device.

It will be understood that the above described embodiment of this invention is for the purpose of illustration and it is intended that the invention be limited only by the scope of the following claims:

What is claimed is:

1. An endless tape in the form of a continuous loop containing intelligence of a continuous function in the form of perforations, said tape having a first surface, a second surface, a 180° twist of said surfaces, a joint at the ends of said surfaces forming said tape into said single continuous loop, a medial line dividing said tape, a lower half of said tape containing intelligence of a portion of said continuous function in the form of perforations through the surfaces of said tape and arranged to extend from one end of said surfaces of said lower half to the other end of said surfaces of said lower half, an upper half of said tape containing intelligence of a complementary portion of said continuous function in the form of perforations through the surfaces of said upper half and extending from one end of said surfaces to the other end of said surfaces whereby the continuous function carried on the tape is continuously readable upon sensing said perforations with suitable means.

2. In combination, an endless tape in the form of a continuous loop containing sine and cosine functions, a first surface of said tape, a second surface of said tape, a 180° twist of said surfaces, a joint at the ends of said surfaces forming said tape into said continuous loop, a medial line dividing said tape, an upper half of said tape containing sin 0 to sin 90 intelligence in the form of perforations through the surfaces of said upper half and extending from one end of said surfaces to the other end of said surfaces, a lower half of said tape containing cos 0 to cos 90 intelligence in the form of perforations through the surfaces of said lower half and extending from one end of said surfaces to the other end of said surfaces, sensing means for reading the sine curve intelligence from said tape, and means for passing said continuous loop across said sensing means to repetitively read said sin 0 to sin 90 intelligence from said upper half and said cos 0 to cos 90 intelligence from said lower half sequentially.

3. A combination as claimed in claim 2 having means for inverting the intelligence read by said sensing means whereby said sine and cosine functions are alternately readable in a positive phase and in a negative phase.

4. In combination a continuous loop tape having a 180° twist, said tape having information in the form of perforations stored therein, a sensing device for reading the information stored on said tape, first sprockets moving said tape to and from said sensing device, a first drive means for driving said first sprockets, a plurality of storage loops of said tape in concentric coils, second sprockets for moving said coils, a second drive means for driving said second sprockets and said concentric coils independent of said first means for driving said first sprockets, a slack section of said tape maintained between said concentric coils and the portion of said tape engaged by said first sprockets and a 180° twist in said tape in said slack section.

References Cited in the file of this patent

UNITED STATES PATENTS 2,496,047 Goddard ---------------- Jan. 31, 1950